Patented Oct. 7, 1941

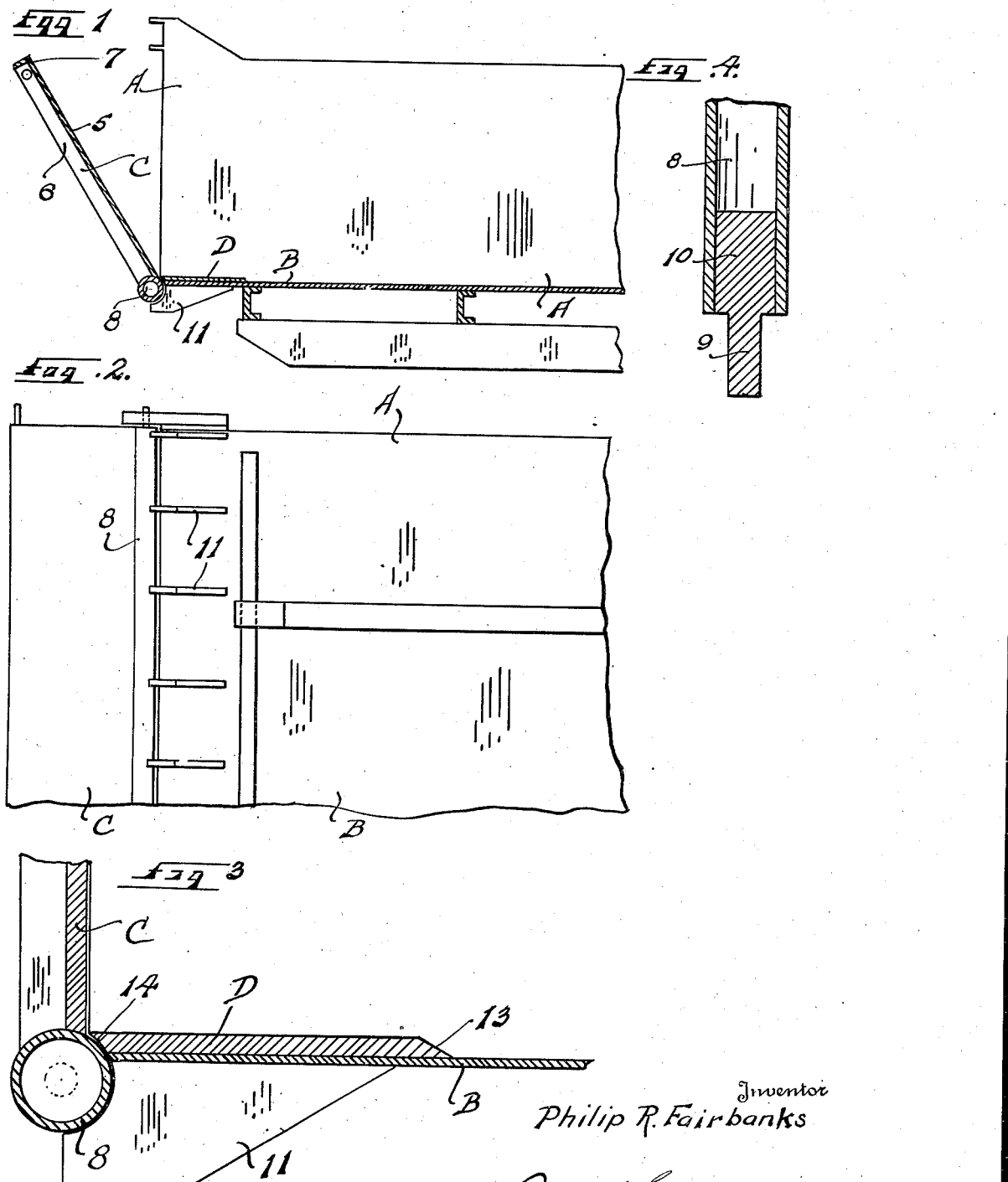

2,258,447

UNITED STATES PATENT OFFICE 2,258,447

TAIL GATE

Philip R. Fairbanks, Ogden, Utah

Application April 5, 1940, Serial No. 328,075

2 Claims. (Cl. 296—57)

My invention relates to dump trucks and the like and has for its object to provide a new and highly efficient tail gate for said truck bodies.

A further object is to provide a dump truck body tail gate which will be stronger than the usual gate and which will be constructed so that no foreign particles such as a small rock will lodge in the hinge connection and prevent the gate from closing completely and will also be free to open freely.

A still further object is to provide a tail gate construction for trucks which will reinforce the rear end of the dump body plate and bed and will make the hinge of the gate tangential to a plate over which the material slips when unloading so that the material will completely dump and so that no foreign particles will catch in the gate hinges, either to impede dumping or prevent the gate from opening or closing. The present invention also aids in throwing material farther from the truck body and farther from the rear wheels of the truck than is commonly possible and which gate is adapted to be hinged for down folding or bottom opening gates.

These and other objects I accomplish with the device illustrated in the accompanying drawing in which similar numerals and letters of reference indicate like parts throughout the several views and as described in the specification forming a part of this application and pointed out in the appended claims.

In the drawing

Figure 1 is a longitudinal section of a dump body sectioning the tail gate transversely showing the gate partially opened.

Figure 2 is a bottom view of the showing made in Figure 1.

Figure 3 is an enlarged transverse section of the tail gate juncture to the dump body bed.

Figure 4 is a transverse diametrical section of one end of the tail or end gate support pins.

In the drawing I have shown the dump truck body as A, with the floor or floor plate shown as B. In the open end of the body the tail or end gate C is pivotally mounted. The tail gate consists of the usual plate 5 and reinforced ends 6 and top 7 with the lower or juncture edge of the gate secured offset to, but being parallel to a true radius of a tubular base bar 8. This base bar 8 is secured to the lower edge of the end plate 5 by welding or other suitable means and each end of the tubular base bar 8 is provided with an extended steel hinge pin 9, formed on the end of an enlarged block 10 which block is welded into each end of the tubular base bar to provide the pivot pins or hinge pins for the tail gate and to strengthen each end of the tubular base bar 8.

Along the bottom of the truck body and spaced apart to give the proper strength I provide reinforcing brackets 11 secured to the bottom plate B of the truck body and having their forward ends or ends adjacent the tail gate base rod formed in a semi-circle to fit snugly to the side wall of the brace rod 8, and take up undue stress, bending or flexing of the base rod when the truck is in its many uses.

Across the bottom plate B of the truck I mount a rear end brace or bed plate D, said brace plate having its forward edge beveled at 13 and its rear edge formed concave at 14 to form a completion of a portion of a circle with the brackets 11 and with the top surface of the plate C set tangential to the brace rod 8 or so that a line extended from the plate C would intercept the uppermost perimeter of the rod 8. The concave arc 14 acts as a cleaner to clean the rod 8 and is substantially in contact therewith.

This construction strengthens the body plate, lengthens the life of the tail gate, and is an economy feature for truck driver and owner, giving lasting strength to the tail gate, longer life to the truck body and providing means against which other trucks may be engaged for the usual maneuvers found in construction jobs.

The present device giving additional strength to the tail gate makes it particularly adaptable to use it with automatic controls for tail gates.

On trucks employing down folding gates with automatic means for controlling the tail gate, such as shown in my former patent application Ser. No. 282,764, filed July 4, 1939, now Patent #2,226,901, and on which other patent applications are being filed, this construction of tail gate makes the gate stronger, and adaptable to receive the stresses which occur in such types of gates which the present day tail gates will not accomplish.

Having thus described my invention, I desire to secure by Letters Patent and claim:

1. A tail gate construction for dump trucks comprising a dump truck body; a bed plate mounted across the rear end of the bottom of the body said plate having the longitudinal edge at the rear of the body formed arcuate; a tail gate for said body having the lower edge of the gate reinforced and formed as a tubular member with the gate pivotally mounted at the ends of the tubular member spacing the tubular member parallel with said arcuate edge of said bed plate with the top surface of the bed plate tangential to said tubular member and substantially in contact therewith.

2. A device as set out in claim 1 including reinforcing brackets mounted at spaced intervals under the rear of said dump truck body with the portion of the bracket adjacent the tubular member of the tail gate formed arcuate and concentric with said tubular member.

PHILIP R. FAIRBANKS.